United States Patent
North et al.

(10) Patent No.: US 9,468,997 B2
(45) Date of Patent: Oct. 18, 2016

(54) APPARATUS AND METHOD FOR CONDUCTIVE COOLING OF AN INFORMATION HANDLING SYSTEM

(71) Applicant: DELL PRODUCTS, L.P., Round Rock, TX (US)

(72) Inventors: Travis C. North, Cedar Park, TX (US); Duen Hsing Hsieh, Taipei (TW); Austin Michael Shelnutt, Leander, TX (US); Christopher M. Helberg, Austin, TX (US); Deeder M. Aurongzeb, Austin, TX (US)

(73) Assignee: DELL PRODUCTS, L.P., Round Rock, TX (US)

( * ) Notice: Subject to any disclaimer, the term of this patent is extended or adjusted under 35 U.S.C. 154(b) by 130 days.

(21) Appl. No.: 14/324,596

(22) Filed: Jul. 7, 2014

(65) Prior Publication Data

US 2016/0007497 A1    Jan. 7, 2016

(51) Int. Cl.
*H05K 7/20* (2006.01)
*B23P 15/26* (2006.01)
*G06F 1/20* (2006.01)

(52) U.S. Cl.
CPC *B23P 15/26* (2013.01); *G06F 1/20* (2013.01)

(58) Field of Classification Search
CPC ............... H05K 7/2039; G06F 1/203
See application file for complete search history.

(56) References Cited

U.S. PATENT DOCUMENTS

| 7,499,274 B2 * | 3/2009 | Noble | H05K 7/20963 165/185 |
| 7,609,517 B2 * | 10/2009 | Sun | H05K 7/20727 361/690 |
| 2011/0133134 A1 * | 6/2011 | Varma | C08L 23/0853 252/511 |

* cited by examiner

*Primary Examiner* — Tuan T Dinh
*Assistant Examiner* — Mukund G Patel
(74) *Attorney, Agent, or Firm* — Isidore, PLLC (57) ABSTRACT

An apparatus provides conductive cooling of an information handling system. The apparatus includes a panel having a vent area formed in the panel. The vent area includes a perimeter, an interior section and a plurality of ribs that extend across the interior section. The vent area further includes several openings defined by lateral spacing between the ribs. The openings extend through the panel and are configured to receive cooling airflow into the openings and to discharge cooling air flow from the openings. A conductive heat sink layer is attached to the panel. The conductive heat sink layer covers a perimeter area surrounding the vent area, with strips of the conductive heat sink layer also covering the ribs, while leaving the openings between the ribs uncovered such that the strips of the conductive heat sink layer function to conduct additional heat away from the vent area along the ribs.

14 Claims, 10 Drawing Sheets

APPARATUS AND METHOD FOR CONDUCTIVE COOLING OF AN INFORMATION HANDLING SYSTEM

BACKGROUND

1. Technical Field

The present disclosure generally relates to cooling of electronic devices and in particular to conductive cooling of an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

During operation, the electronic hardware components of the information handling system generate heat. In order for the information handling system to properly function, the electronic components are required to remain below a certain temperature during operation. Various devices are known for removing heat from electronic components. For example, fans and heat sinks have been used to cool information handling systems. An ongoing need exists for improved cooling of information handling systems.

BRIEF SUMMARY

Disclosed is an apparatus, an information handling system and a method for conductive cooling of an information handling system.

According to one embodiment, the apparatus comprises a panel having a first surface and a second surface. A vent area is formed in the panel. The vent area includes a perimeter and an interior section with several ribs that extend across the interior section. The vent area also includes several openings defined by lateral spacing between the ribs. The openings extend through the panel from the first to the second surface. The openings are configured to receive cooling airflow into the openings and to discharge cooling air flow from the openings. A conductive heat sink layer is attached to the first surface of the panel. The conductive heat sink layer covers a perimeter area surrounding the vent area, with strips of the conductive heat sink layer also covering the ribs, while leaving the openings between the ribs uncovered. The strips of the conductive heat sink layer function to conduct additional heat away from the vent area along the ribs.

According to another embodiment, an information handling system has at least one component to be cooled. The information handling system includes a panel that has a first surface and a second surface. A vent area is formed in the panel. The vent area includes a perimeter and an interior section with several ribs that extend across the interior section. The vent area further includes several openings defined by lateral spacing between the ribs. The openings extend through the panel from the first to the second surface. The openings are configured to receive cooling airflow into the vent area and to discharge cooling air flow from the vent area. A conductive heat sink layer is attached to the first surface of the panel. The conductive heat sink layer covers an area surrounding the perimeter of the vent area. The conductive heat sink layer also includes strips of the conductive heat sink material covering the ribs, with the openings between the ribs uncovered, such that the strips of the conductive heat sink layer function to conduct additional heat away from the vent area along the ribs.

Also disclosed is method of cooling an information handling system. The method comprises providing a panel having a first surface and a second surface. A vent area is formed in the panel. The vent area includes several ribs that extend laterally across the vent area. The vent area further includes several openings defined by lateral spacing between the ribs. The openings extend between the ribs through the first and second surfaces of the panel. The openings extend through the panel from the top to the bottom surface. The openings are configured to receive cooling airflow into the vent area and to discharge cooling air flow from the vent area. A conductive heat sink layer is provided. The conductive heat sink layer is attached to the first surface of the panel. The conductive heat sink layer includes an exterior layer that covers a perimeter area surrounding the vent area. The conductive heat sink layer also includes strips of the conductive heat sink material covering the ribs, while leaving the openings between the ribs uncovered, such that the conductive heat sink layer strips function to conduct additional heat away from the vent area along the ribs.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide an apparatus, an information handling system and a method for conductive cooling of an information handling system.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
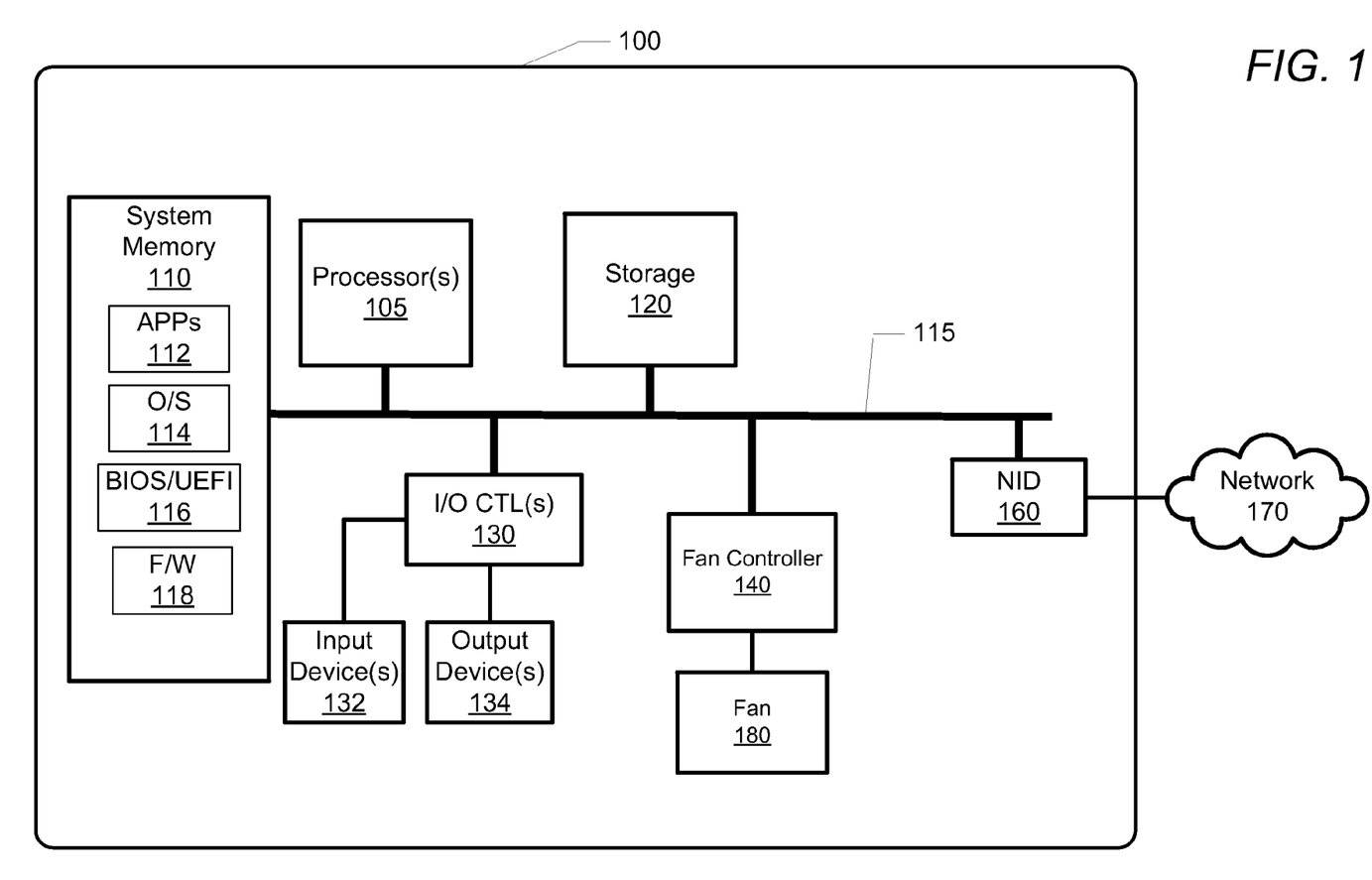
FIG. 1 illustrates an example block diagram of an information handling system within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes processor(s) 105 coupled to system memory 110 via system interconnect 115. System interconnect 115 can be interchangeably referred to as a system bus, in one or more embodiments. Also coupled to system interconnect 115 is storage 120 within which can be stored one or more software and/or firmware modules and/or data (not specifically shown). In one embodiment, storage 120 can be a hard drive or a solid state drive. The one or more software and/or firmware modules within storage 120 can be loaded into system memory 110 during operation of IHS 100. As shown, system memory 110 can include therein a plurality of software and/or firmware modules including application(s) 112, operating system (O/S) 114, basic input/output system (BIOS) 116 and firmware (F/W) 118.

In one or more embodiments, BIOS 116 comprises additional functionality associated with unified extensible firmware interface (UEFI), and can be more completely referred to as BIOS/UEFI in these embodiments. The various software and/or firmware modules have varying functionality when their corresponding program code is executed by processor(s) 105 or other processing devices within IHS 100.

IHS 100 further includes one or more input/output (I/O) controllers 130 which support connection by, and processing of signals from, one or more connected input device(s) 132, such as a keyboard, mouse, touch screen, or microphone. I/O controllers 130 also support connection to and forwarding of output signals to one or more connected output devices 134, such as a monitor or display device or audio speaker(s) or light emitting diodes (LEDs).

Additionally, in one or more embodiments, IHS 100 includes one or more fans 180 for cooling the components of IHS 100 such as processor(s) 105. IHS 100 can also include structures such as ducts within IHS 100 for directing the cooling air from fan 180 to locations within IHS 100. IHS 100 further includes a fan controller 140 that is connected to fan 180. Fan controller 140 is communicatively coupled with processor(s) 105 via system interconnect 115. Fan controller 140 can at least partially control the operation of fan 180.

IHS 100 further comprises a network interface device (NID) 160. NID 160 enables IHS 100 to communicate and/or interface with other devices, services, and components that are located external to IHS 100. These devices, services, and components can interface with IHS 100 via an external network, such as example network 170, using one or more communication protocols. In one embodiment, a customer provisioned system/platform can comprise multiple devices located across a distributed network, and NID 160 enables IHS 100 to be connected to these other devices. Network 170 can be a local area network, wide area network, personal area network, and the like, and the connection to and/or between network 170 and IHS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

Those of ordinary skill in the art will appreciate that the hardware components and basic configuration depicted in FIG. 1 and described herein may vary. For example, the illustrative components within IHS 100 are not intended to be exhaustive, but rather are representative to highlight components that can be utilized to implement aspects of the present disclosure. For example, other devices/components may be used in addition to or in place of the hardware depicted. The depicted example does not convey or imply any architectural or other limitations with respect to the presently described embodiments and/or the general disclosure.

Figure 2:
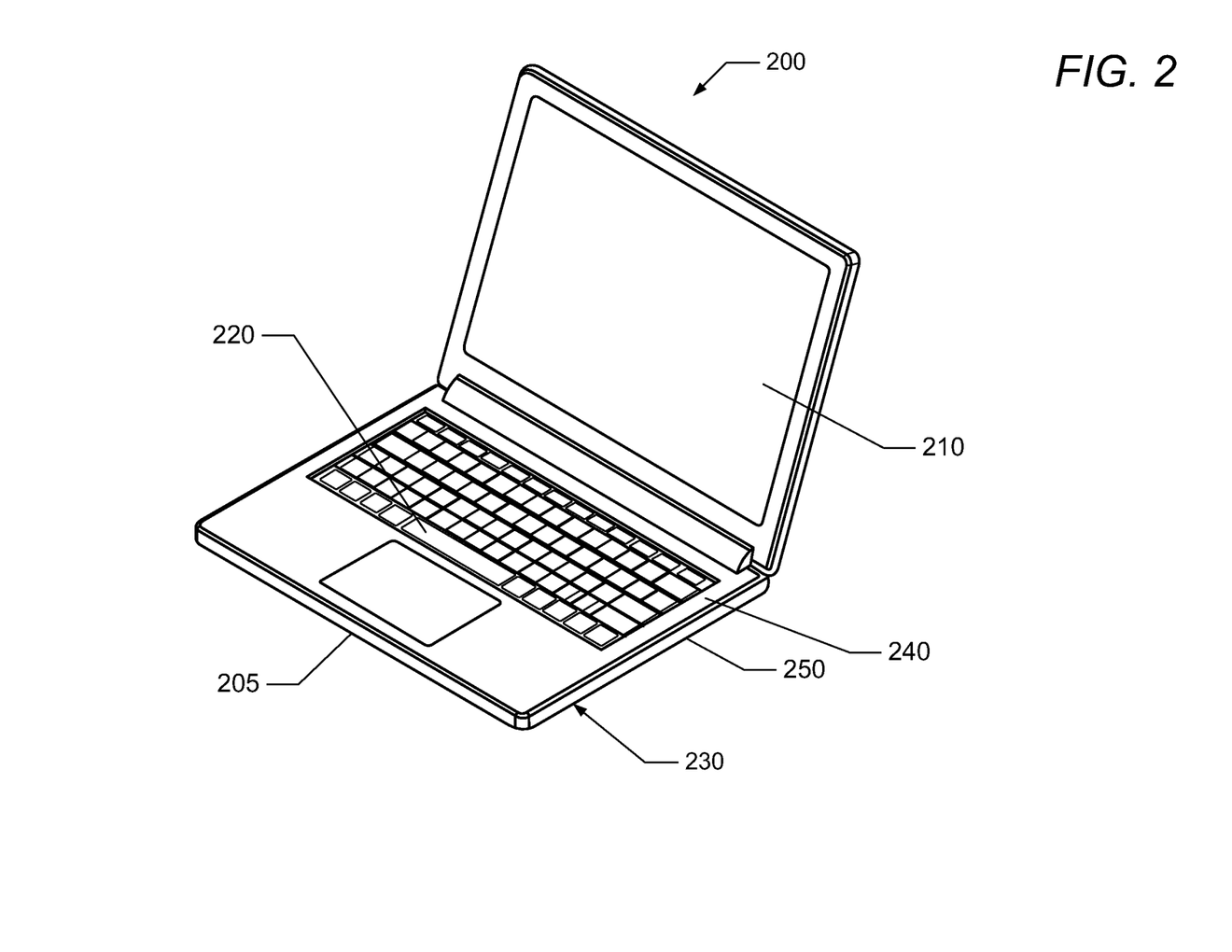
FIG. 2 illustrates an overall view of a physical implementation of an information handling system, in accordance with one embodiment.

With reference now to FIG. 2, there is illustrated one embodiment of a physical packaging of the components of IHS 100. In the description of FIG. 2, reference will also be made to FIG. 1. IHS 100 can be packaged in the form of a mobile or portable computer 200. In one embodiment, mobile computer 200 can be a laptop or notebook computer. In another embodiment, mobile computer 200 can be a tablet computer or smartphone. Example mobile computer 200 comprises a base section 205 and a video display 210. Base section 205 contains the majority of the electronic components of IHS 100 including processor 105, system memory 110 and storage 120. Base section 205 includes a keyboard 220 to allow a user to provide input to mobile computer 200. A cover 230 covers the base section 205. Cover 230 protects the components within IHS 100. Cover 230 can be formed from a variety of materials including metals, plastics and composite materials. Cover 230 is formed by a top panel 240 and a bottom panel 250. Top panel 240 and bottom panel 250 can be attached to base panel 205 using fasteners or snap fittings.

Figure 3:
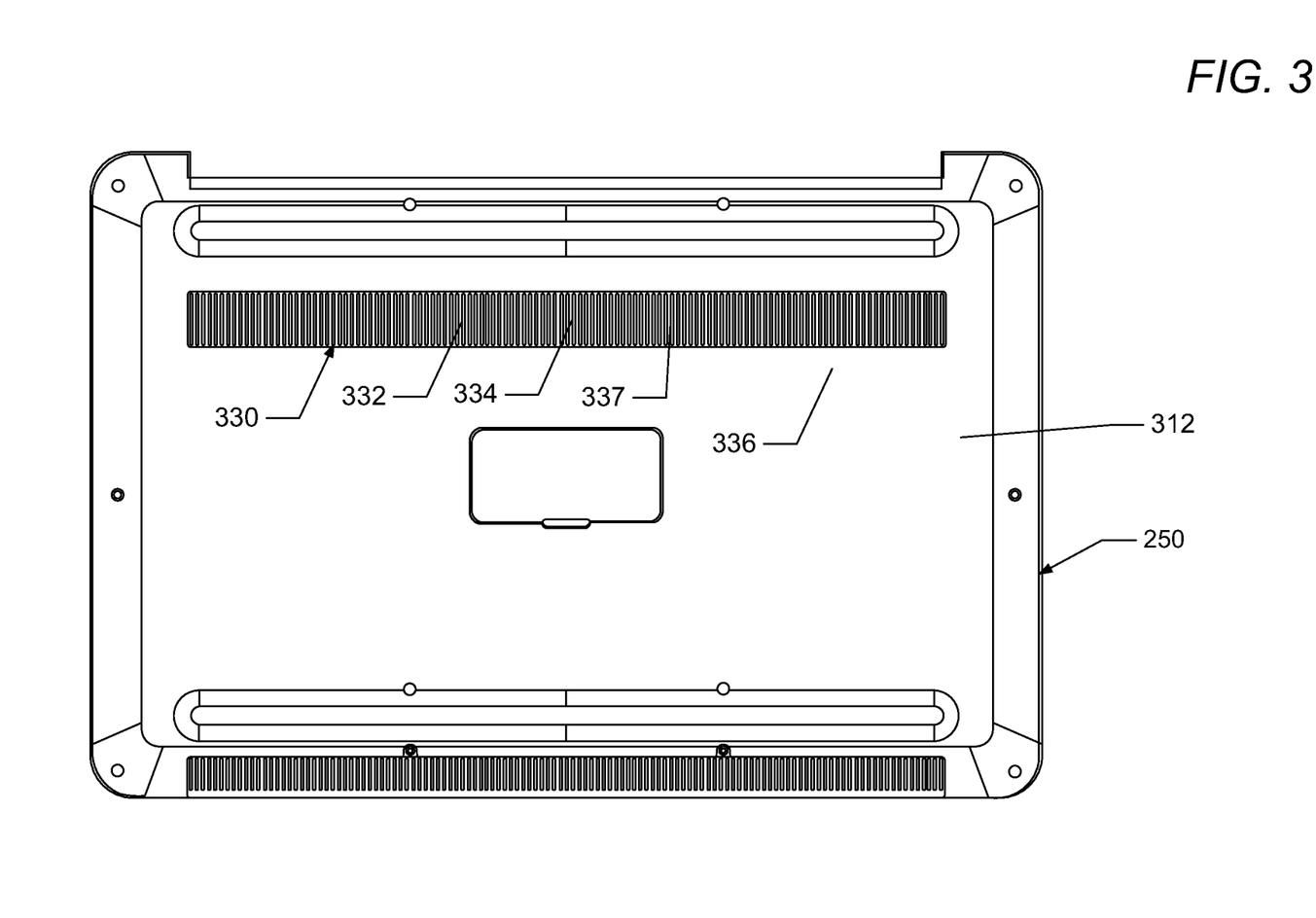
FIG. 3 is a top view of an information handling system panel, according to one or more embodiments.
Figure 4:
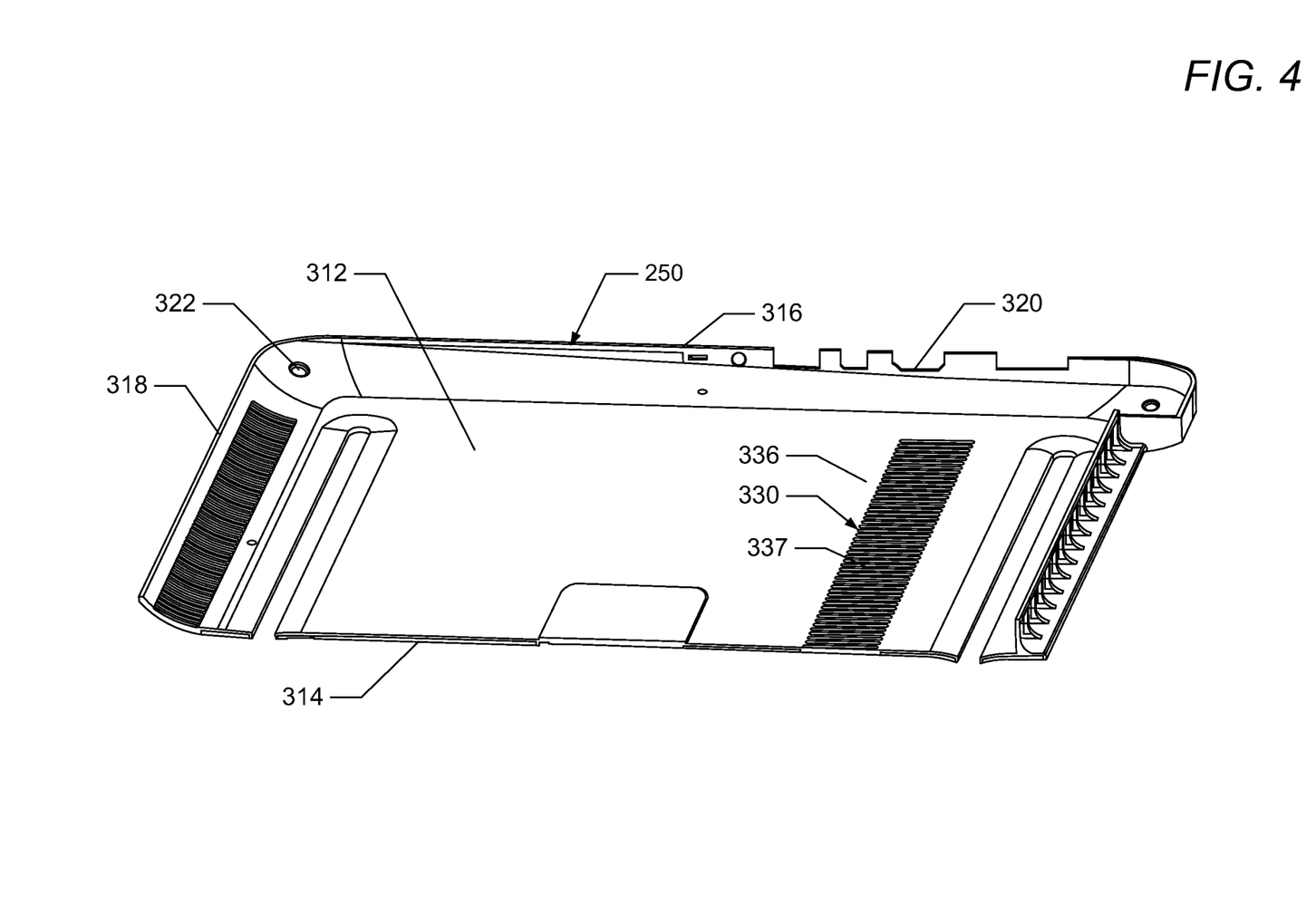
FIG. 4 is a cross-sectional view of an information handling system panel, according to one or more embodiments.

Referring to FIGS. 3 and 4, there is illustrated one embodiment of bottom panel 250. Bottom panel 250 can be formed from suitable materials such as molded plastic, carbon fiber or metals. Bottom panel 250 includes a top surface 312 and a bottom surface 314 (which are also referred to herein as a first surface and a second surface). Bottom panel 250 also includes side walls 316 that terminate in a rim 318. Several slots 320 are formed in side walls 316 to allow access to components such as connectors of IHS 100. Holes 322 are formed in bottom panel 250. Holes 322 accept fasteners (not shown) in order to retain bottom panel 250 to IHS 100.

A vent area 330 is formed in bottom panel 250. The vent area 330 includes a perimeter 336 and an interior section 337 with several spaced-apart parallel ribs 332 that extend laterally across the vent area. Vent area 330 further includes several openings 334 that are defined by the lateral spacing between the ribs 332. The openings 334 extend through the panel 250 from the top surface 312 to the bottom surface 314. The openings 334 are configured to receive cooling airflow into the vent area and to discharge cooling air flow from the vent area. The cooling airflow can be supplied by fan 180 (FIG. 1) in one or more embodiments. The perimeter of vent area 330 is surrounded by a perimeter area 336.

Figure 5:
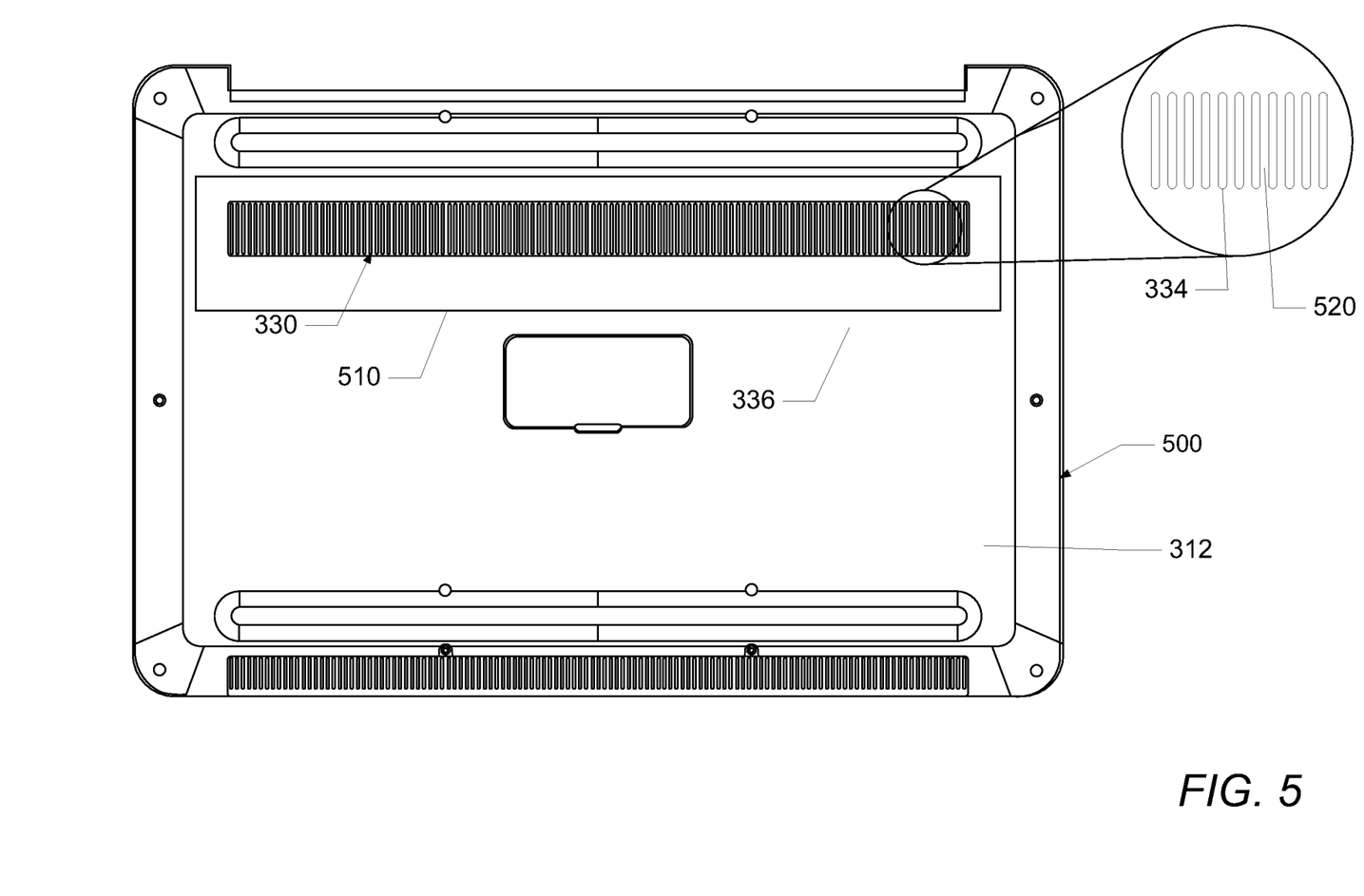
FIG. 5 is a top view of an information handling system panel with a conductive heat sink layer, according to one or more embodiments.
Figure 6:
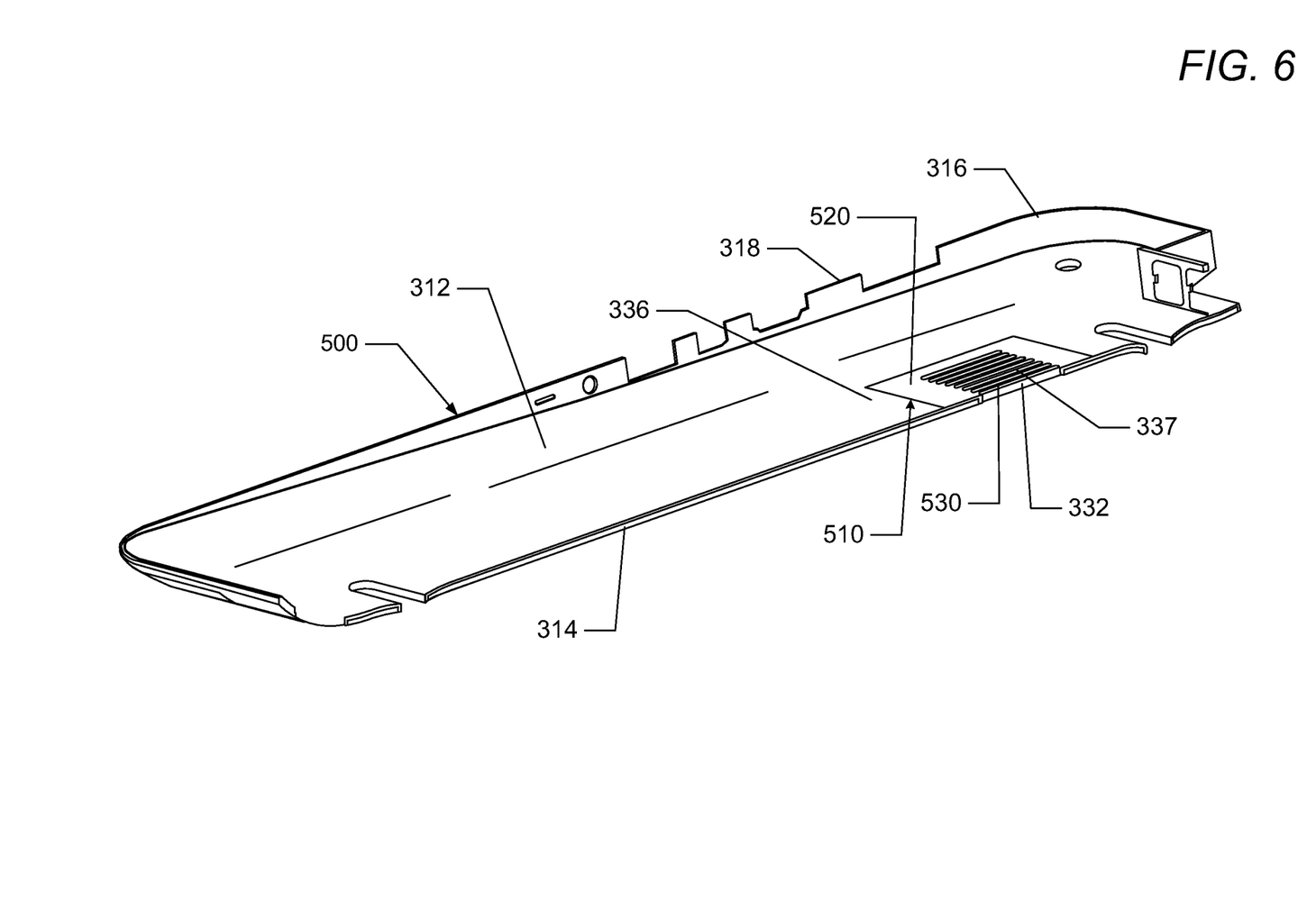
FIG. 6 is a cross-sectional view of an information handling system panel with a conductive heat sink layer, according to one or more embodiments.

FIGS. 5 and 6 show another example bottom panel 500. Bottom panel 500 is similar to bottom panel 250 with the addition of a conductive heat sink layer 510 that has been attached to the top surface 312 of bottom panel 250. The conductive heat sink layer 510 includes a perimeter portion 520 that covers the perimeter area 336 surrounding the vent area 330. The conductive heat sink layer 510 further includes strips 530 of the conductive heat sink material that covers the ribs 332. The openings 334 between the ribs 332 are left uncovered, such that the conductive heat sink strips 530 function to conduct additional heat away from the vent area 330 along the ribs 332. The conductive heat sink layer 510 conductively cools the vent area 330.

In one embodiment, the conductive heat sink layer 510 is formed from graphene. In another embodiment, the conductive heat sink layer 510 is formed from graphite. In an additional embodiment, the conductive heat sink layer 510 is formed from a mixture of graphene and graphite. In one embodiment, the conductive heat sink layer 510 can be formed from a mixture comprising 30 to 80 weight percent graphene and the remaining weight percent of graphite. Graphene has a high thermal conductivity that ranges between 1400 to 5000 watts/meter-degree Kelvin. The thermal conductivity of graphene is approximately 5 times greater than graphite.

Graphene is commercially available in the form of particles or fibers. In one embodiment, the conductive heat sink layer 510 is formed from randomly oriented graphene particles. In another embodiment, the conductive heat sink layer 510 is formed from oriented graphene fibers. In an additional embodiment, the conductive heat sink layer 510 is formed from a combination of oriented graphene fibers and randomly oriented graphene particles.

Figure 7:
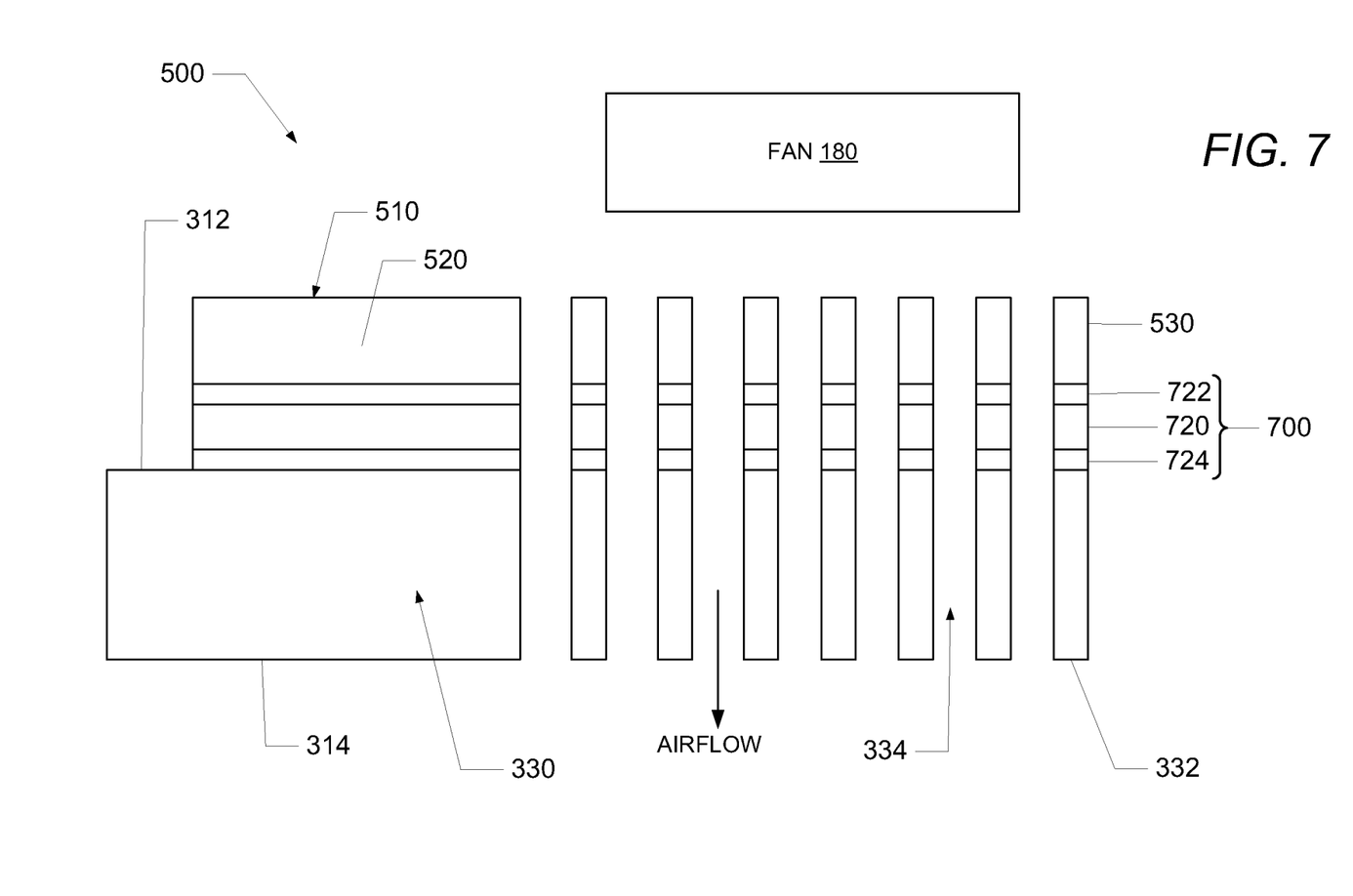
FIG. 7 is an enlarged cross-sectional view of a vent area of the panel according to one or more embodiments.

FIG. 7 illustrates a cross-sectional view of bottom panel 500 taken through vent area 330. Referring to FIG. 7, conductive heat sink layer 510 is attached to bottom panel 500 using a mounting layer 700. Mounting layer 700 is disposed between bottom panel 500 and the conductive heat sink layer 510. Mounting layer 700 comprises a support sheet 720 disposed between a first adhesive layer 722 and a second adhesive layer 724. In one embodiment, mounting layer 700 can be a thermally conductive double-sided adhesive tape. Mounting layer 700 securely attaches the conductive heat sink layer 510 to the vent area 330. Mounting layer 700 also securely attaches the conductive heat sink strips 530 to the ribs 332. The first adhesive layer 722 is located between the conductive heat sink layer 510 and support sheet 720. The second adhesive layer 724 is located between the top surface 312 and support sheet 720. Fan 180 supplies cooling airflow that is received at the openings 334, flows between strips 530 and ribs 332 and is discharged from the openings 334.

Figure 8:
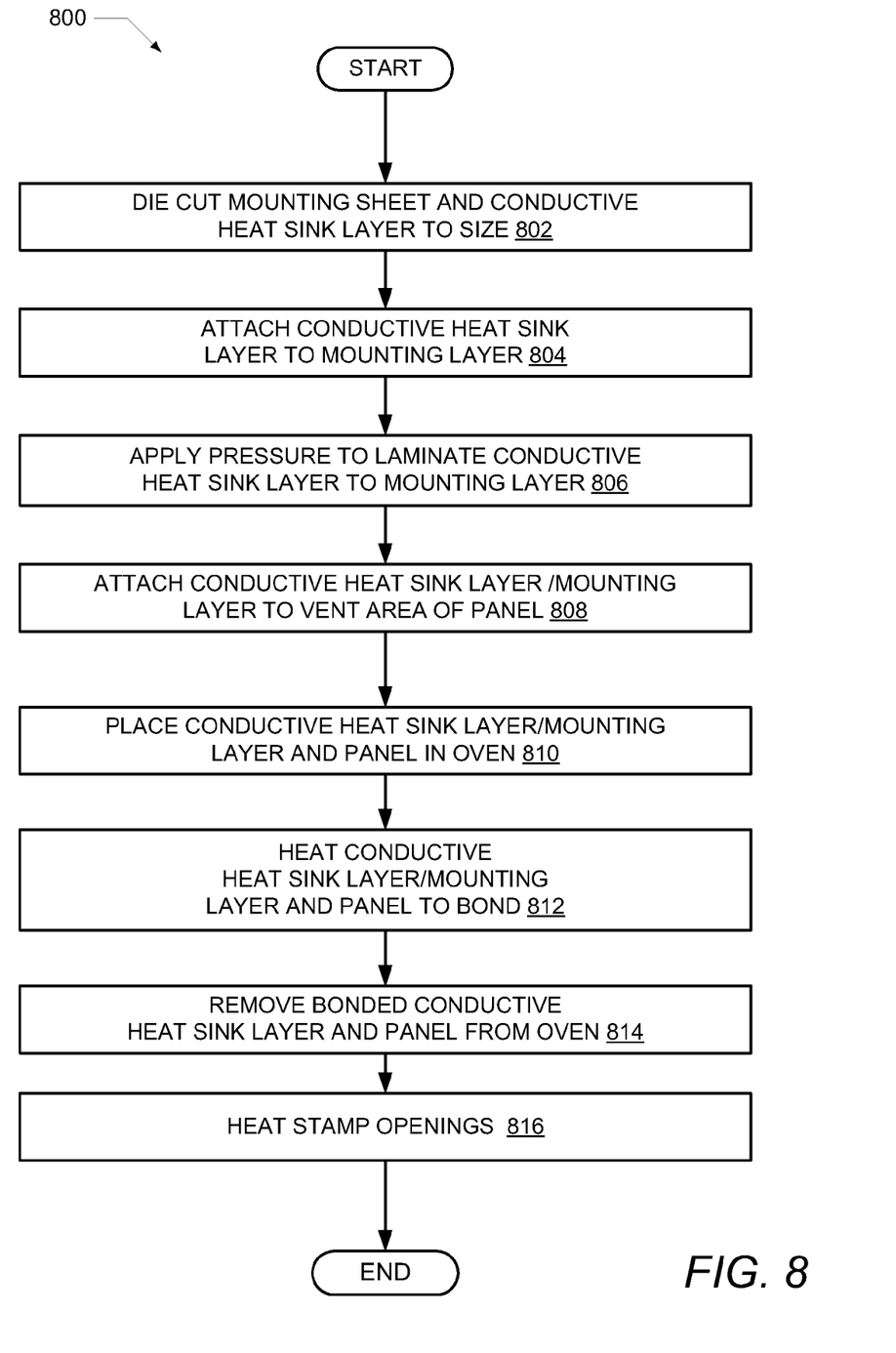
FIG. 8 is a flow chart illustrating an example of a method for manufacturing a panel with a conductive heat sink layer, according to one or more embodiments.
Figure 9:
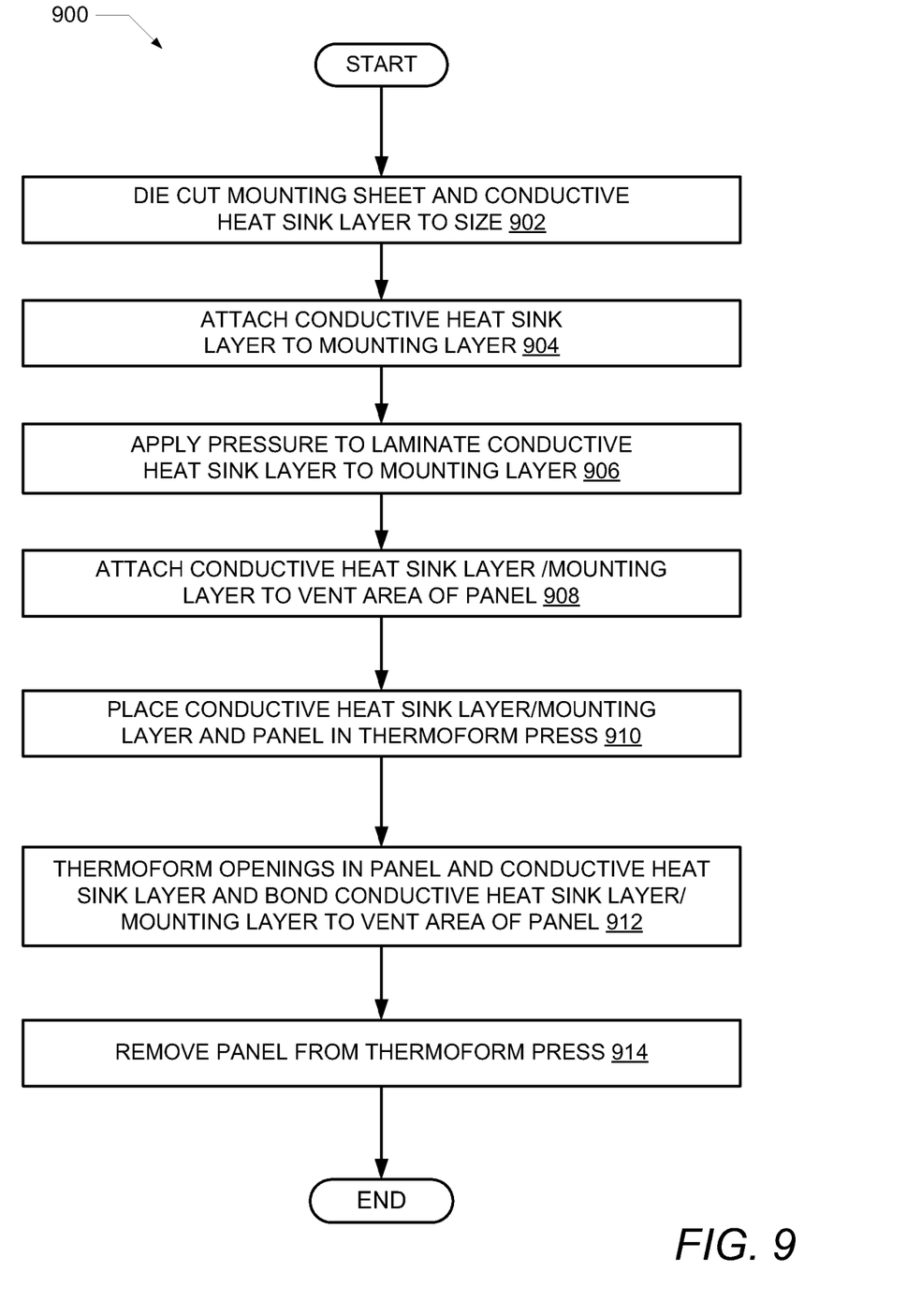
FIG. 9 is a flow chart illustrating another example of a method for manufacturing a panel with a conductive heat sink layer, according to one or more embodiments.
Figure 10:
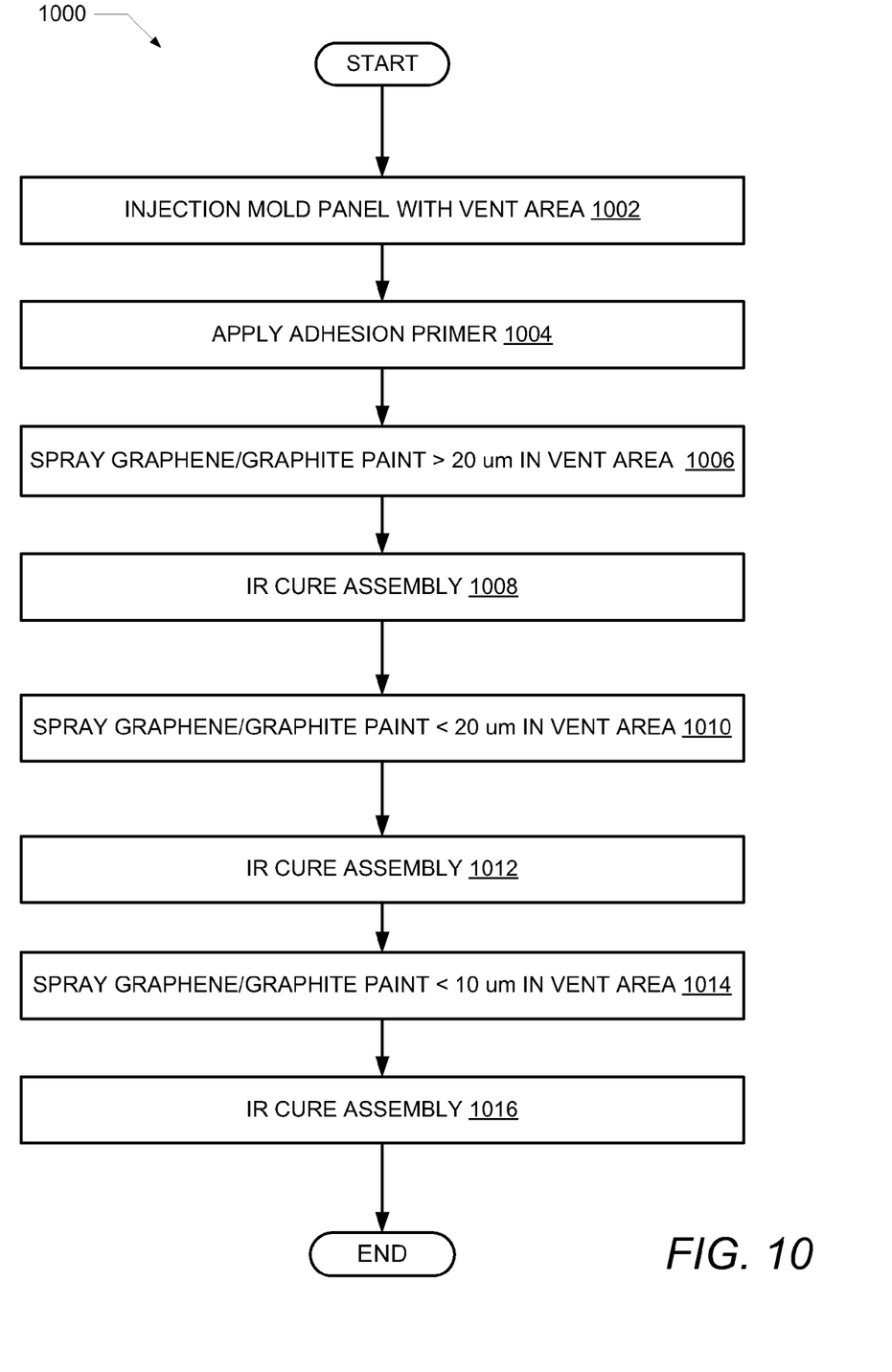
FIG. 10 is a flow chart illustrating an additional example of a method for manufacturing a panel with a conductive heat sink layer, according to one or more embodiments.

FIGS. 8-10 illustrate flowcharts of exemplary methods by which bottom panel 500 within the preceding figures can be manufactured. Generally, methods 800, 900 and 1000 collectively represent different methods of manufacturing bottom panel 500. The description of each method is provided with general reference to the specific components illustrated within the preceding FIGS. 1-7.

With reference to FIG. 8, method 800 illustrates one embodiment of a method for manufacturing bottom panel 500. Method 800 begins at the start block and proceeds to block 802 where the conductive heat sink layer 510 and mounting layer 700 are cut using a die (die cut) to a pre-determined shape and size. At block 804, the conductive heat sink layer 510 is attached to first adhesive layer 722 of mounting layer 700. Pressure is applied to the combination of conductive heat sink layer 510 and mounting layer 700 (block 806) in order to laminate conductive heat sink layer 510 and mounting layer 700 together. The combination of the conductive heat sink layer 510 and mounting layer 700 is attached to bottom surface 312 of bottom panel 500 (block 808). In this embodiment, bottom panel 500 has openings 334 formed therein during the forming of the bottom panel 500. Specifically, the conductive heat sink layer 510 and mounting layer 700 are placed over the perimeter area 336 surrounding the vent area 330 with the second adhesive layer 724 in contact with bottom surface 312. At this point of the method, the openings 334 are covered by the conductive heat sink layer 510.

At block 810, bottom panel 500 with the attached conductive heat sink layer 510 is placed into an oven and heated (block 812) in order to bond the conductive heat sink layer 510 to bottom panel 500. The bonded bottom panel 500 and conductive heat sink layer 510 is removed from the oven (block 814) and the openings 334 are heat stamped into the mounting layer 720 and the conductive heat sink layer 510 (block 816) using a heated die. Method 800 then ends.

Referring to FIG. 9, method 900 illustrates another method for manufacturing bottom panel 500. Method 900 begins at the start block and proceeds to block 902 where the conductive heat sink layer 510 and mounting layer 700 are cut using a die (die cut) to a pre-determined shape and size. At block 904, the conductive heat sink layer 510 is attached to first adhesive layer 722 of mounting layer 700. Pressure is applied to the combination of conductive heat sink layer 510 and mounting layer 700 (block 906) in order to laminate conductive heat sink layer 510 and mounting layer 700 together. The combination of the conductive heat sink layer 510 and mounting layer 700 is attached to bottom surface 312 of bottom panel 500 (block 908). In this embodiment, bottom panel 500 does not contain openings 334. Specifically, the conductive heat sink layer 510 and mounting layer 700 are placed over the perimeter area 336 surrounding the vent area 330 with the second adhesive layer 724 in contact with bottom surface 312. At block 910, bottom panel 500 with the attached conductive heat sink layer 510 is placed into a thermoform press and heated (block 912) in order to form the openings 334 in the mounting layer 720, the bottom panel 500 and in the conductive heat sink layer 510. At the same time in the thermoform press, at block 912, the conductive heat sink layer 510 is bonded to bottom panel 500. The bonded bottom panel 500 with the conductive heat sink layer 510 is removed from the thermoform press at block 914. Method 900 then ends.

FIG. 10 illustrates an additional method 1000 for manufacturing bottom panel 500. Method 1000 begins at the start block and proceeds to block 1002 where the bottom panel 500 is molded with the vent area 330 and openings 334. At block 1004, an adhesion primer is applied by spraying the adhesion primer over the vent area 330. Next, a first graphene/graphite paint mixture is sprayed on top surface 312 covering the vent area 330, including perimeter area 336 and openings 334 (block 1006). The first graphene/graphite paint mixture sprayed at block 1006 has a particle size greater than 20 micrometers. The first graphene/graphite paint mixture is cured in an infrared oven (block 1008). A second application of a graphene/graphite paint mixture is sprayed over the first graphene/graphite paint mixture covering the vent area 330, including perimeter area 336 and openings 334 (block 1010). The second graphene/graphite paint mixture sprayed at block 1010 has a particle size less than 20 micrometers. The second graphene/graphite paint mixture is cured in an infrared oven (block 1012).

A third application of a graphene/graphite paint mixture is sprayed over the second graphene/graphite paint mixture covering the vent area 330, including perimeter area 336 and openings 334 (block 1014). The third graphene/graphite paint mixture sprayed at block 1014 has a particle size less than 10 micrometers. The third graphene/graphite paint mixture is cured in an infrared oven (block 1016). Method 1000 then terminates.

FIG. 10 was illustrated using several different graphene/graphite mixtures having several different particle sizes that result in several different applied thicknesses of graphene/graphite material. It is understood that other combinations of particle sizes and thickness of graphene/graphite can also be used.

In some implementations, certain steps of the above flow chart methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entire hardware embodiment or an embodiment combining software (including firmware, resident software, microcode, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An apparatus for cooling an information handling system, the apparatus comprising:
   a panel having a first surface and a second surface;
      a vent area formed in the panel, the vent area including a perimeter, an interior section and a plurality of ribs that extend across the interior section, the vent area further including a plurality of openings defined by lateral spacing between the ribs, the openings extending through the panel from the first to the second surface, the openings configured to receive cooling airflow into the openings and to discharge cooling air flow from the openings;
   a conductive heat sink layer physically attached to the first surface of the panel, the conductive heat sink layer covering a perimeter area surrounding the vent area, with strips of the conductive heat sink layer also covering the ribs, while leaving the openings between the ribs uncovered such that the strips of the conductive heat sink layer function to conduct additional heat away from the vent area along the rib; and
   a mounting layer disposed between the panel and the conductive heat sink layer, wherein the mounting layer comprises a support sheet disposed between a first adhesive layer and a second adhesive layer to securely attach the conductive heat sink layer to the vent area of the panel.

2. The apparatus of claim 1, wherein the conductive heat sink layer is formed from a mixture of graphene and graphite.

3. The apparatus of claim 2, wherein the mixture comprises 30 to 80 weight percent graphene and a remaining weight percent of graphite.

4. An information handling system having at least one component to be cooled, the information handling system comprising:
   a panel for the information handling system, the panel having a first surface and a second surface;
   a vent area formed in the panel, the vent area including a perimeter, an interior section and a plurality of ribs that extend across the interior section, the vent area further including a plurality of openings defined by lateral spacing between the ribs, the openings extending through the panel from the first to the second surface, the openings configured to receive cooling airflow into the openings and to discharge cooling air flow from the openings;

a conductive heat sink layer physically attached to the first surface of the panel, the conductive heat sink layer covering a perimeter area surrounding the vent area, with strips of the conductive heat sink layer also covering the ribs, while leaving the openings between the ribs uncovered such that the strips of the conductive heat sink layer function to conduct additional heat away from the vent area along the ribs; and a mounting layer disposed between the panel and the conductive heat sink layer, wherein the mounting layer comprises a support sheet disposed between a first adhesive layer and a second adhesive layer to securely attach the conductive heat sink layer to the vent area of the panel.

5. The information handling system of claim 4, wherein the conductive heat sink layer is formed from a mixture of graphene and graphite.

6. The information handling system of claim 5, wherein the mixture comprises 30 to 80 weight percent graphene and a remaining weight percent of graphite.

7. A method of cooling an information handling system, the method comprising:

providing a panel for the information handling system, the panel having a first surface and a second surface;

forming a vent area in the panel, the vent area including a perimeter, an interior section and a plurality of ribs that extend across the interior section, the vent area further including a plurality of openings defined by lateral spacing between the ribs, the openings extending through the panel from the first to the second surface, the openings configured to receive cooling airflow into the openings and to discharge cooling air flow from the openings;

attaching a conductive heat sink layer to the first surface of the panel, the conductive heat sink layer covering a perimeter area surrounding the vent area, with strips of the conductive heat sink layer also covering the ribs, while leaving the openings between the ribs uncovered such that the strips of the conductive heat sink layer function to conduct additional heat away from the vent area along the ribs; and attaching a mounting layer disposed between the panel and the conductive heat sink, wherein the mounting layer comprises a support sheet disposed between a first adhesive layer and a second adhesive layer to securely attach the conductive heat sink layer to the vent area of the panel.

8. The method of claim 7, wherein the conductive heat sink layer is formed from a mixture of graphene and graphite.

9. The method of claim 8, wherein the mixture comprises 30 to 80 weight percent graphene and a remaining weight percent of graphite.

10. The method of claim 7, further comprising: cutting the mounting layer and the conductive heat sink layer to a pre-determined shape; laminating the mounting layer to the conductive heat sink layer; attaching the mounting layer and the conductive heat sink layer to the panel over the vent area; and forming the openings in the mounting layer and the conductive heat sink layer.

11. The method of claim 10, further comprising:

placing the panel, the mounting layer and the conductive heat sink layer in an oven; and heating the panel, the mounting layer and the conductive heat sink layer in the oven such that the heat conductive sheet, the mounting sheet and the panel bond.

12. The method of claim 10, wherein the openings are formed by heat stamping.

13. The method of claim 10, wherein the openings are formed by thermoforming.

14. The method of claim 7, further comprising:

spraying a heat conductive composition over the vent area such that the heat conductive composition covers the vent area and the ribs; and curing the first heat conductive composition wherein, the cured heat conductive composition forms the conductive heat sink layer.

* * * * *